United States Patent
Seo

(10) Patent No.: US 7,984,788 B2
(45) Date of Patent: Jul. 26, 2011

(54) LAMINATED ACOUSTIC ABSORPTION SHEET WITH FLAME RETARDANT

(75) Inventor: Duckcheol Seo, Cheonan-si (KR)

(73) Assignee: Huneco Co., Ltd., Pyeongtaek-si (KR)

( * ) Notice: Subject to any disclaimer, the term of this patent is extended or adjusted under 35 U.S.C. 154(b) by 0 days.

(21) Appl. No.: 12/516,707

(22) PCT Filed: Nov. 27, 2007

(86) PCT No.: PCT/KR2007/006039
§ 371 (c)(1),
(2), (4) Date: Dec. 17, 2009

(87) PCT Pub. No.: WO2008/066314
PCT Pub. Date: Jun. 5, 2008

(65) Prior Publication Data
US 2010/0108439 A1    May 6, 2010

(30) Foreign Application Priority Data

Nov. 29, 2006 (KR) ........................ 10-2006-0119379

(51) Int. Cl.
*E04B 1/84* (2006.01)
*E04B 1/82* (2006.01)
*E04B 1/88* (2006.01)
*B32B 7/08* (2006.01)
*E04B 1/74* (2006.01)
*B32B 7/00* (2006.01)

(52) U.S. Cl. ........... 181/294; 181/290; 181/286; 156/93
(58) Field of Classification Search .................. 181/294, 181/290, 296, 286, 284; 156/93
See application file for complete search history.

(56) References Cited

U.S. PATENT DOCUMENTS

| 4,088,620 | A  | * | 5/1978  | Nihongi et al. ............... 524/503 |
| 4,726,987 | A  | * | 2/1988  | Trask et al. .................... 442/373 |
| 4,892,769 | A  | * | 1/1990  | Perdelwitz et al. ............. 428/68 |
| 5,225,140 | A  | * | 7/1993  | Hayashikoshi et al. ....... 264/571 |
| 6,042,765 | A  | * | 3/2000  | Sugahara et al. ............ 264/46.1 |
| 6,383,623 | B1 | * | 5/2002  | Erb, Jr. ..................... 428/299.7 |
| 6,905,987 | B2 | * | 6/2005  | Noda et al. .................... 442/364 |
| 7,479,313 | B2 | * | 1/2009  | Chang et al. .................... 428/31 |
| 7,491,770 | B2 | * | 2/2009  | Autran et al. ................. 525/191 |
| 7,694,779 | B2 | * | 4/2010  | Takayasu et al. ............. 181/294 |
| 2003/0134556 | A1 | * | 7/2003 | Christie et al. ................ 442/327 |
| 2005/0212166 | A1 | * | 9/2005 | Seo et al. ...................... 264/147 |
| 2007/0190876 | A1 | * | 8/2007 | Ogawa et al. ................. 442/136 |
| 2009/0258559 | A1 | * | 10/2009 | Anantharamaiah et al. .. 442/334 |

FOREIGN PATENT DOCUMENTS

| JP | 11180224    | A | * | 7/1999 |
| KR | 2004060090  | A | * | 7/2004 |
| KR | 2005027598  | A | * | 3/2005 |
| KR | 2006032571  | A | * | 4/2006 |

* cited by examiner

*Primary Examiner* — Edgardo San Martin
(74) *Attorney, Agent, or Firm* — Rothwell, Figg, Ernst & Manbeck, P.C.

(57) ABSTRACT

The present invention relates to a light laminated acoustic absorption sheet. The light laminated acoustic absorption sheet with flame retardant is characterized in that one or more thermoplastic fibers (a) having a low melting point and selected from polyethylene, polypropylene, polyvinyl chloride, polyester, polyethylene-polyester copolymers, and one or more polyester interlaced-textured yarns or thermoplastic hollow fibers (b) having a higher melting point than the thermoplastic fiber (a) and selected from polyester, polyethylene, nylon, hot-meltable fluororesin are mixed and opened so as to prepare a mat, and two or more sheets of mats are laminated by using an apparatus of manufacturing a stampable sheet so as to manufacture the laminated sheet, and then the laminated sheet is impregnated with flame retardant liquid.

6 Claims, No Drawings

LAMINATED ACOUSTIC ABSORPTION SHEET WITH FLAME RETARDANT

CROSS REFERENCE TO RELATED APPLICATION(S)

This application is a 35 U.S.C. §371 National Phase Entry Application from PCT/KR2007/006039, filed Nov. 27, 2007, and designating the United States. This application also claims the benefit of Korean Patent Application No. 10-2006-0119379 filed Nov. 29, 2006, the disclosure of which is incorporated herein in its entirety by reference.

TECHNICAL FIELD

The present invention relates to a light laminated acoustic absorption sheet, more particularly, to a laminated acoustic absorption sheet with flame retardancy, which has an excellent strength and a mechanical or physical property.

BACKGROUND ART

As a result of recent accelerated industrial development, serious damage due to noise has been increased. Thus, various acoustic absorption materials had been developed, and wasted tire chips, cork and foam rubber was mainly used as the conventional acoustic absorption materials. These acoustic absorption materials are low-priced and eco-friendly, but have some disadvantages that they have a non-uniform filled thickness and a slow working speed and also a crack may be generated. Further, in case of the cork or the foam rubber, they have a uniform filled thickness and an excellent constructability, but also have some disadvantages that they have a complicated working process and a separated gap and also the crack may be generated.

Therefore, there have been developed various acoustic absorption materials like an acoustic absorption board made of polyester fiber, or made by foaming resin such as urethane, polypropylene, polyethylene and the like.

However, in case of the acoustic absorption material made of polyester fiber, if liquid flame retardant is added to manufacture an acoustic absorption material having flame retardancy, there are some problems that, since a weight of the acoustic absorption material is considerably increased, it is inconvenient to convey it and also it is difficult to carry out a construction work.

SUMMARY OF THE INVENTION

Therefore, the present invention is provided to solve the problems. In order to prevent the increase in the weight of the acoustic absorption material, even through the liquid flame retardant is impregnated therein, a light plate material is prepared and then immersed in the liquid flame retardant so as to obtain a flame retardant effect.

An object of the present invention is to provide a light laminated acoustic absorption sheet which is manufactured by immersing a light acoustic absorption sheet in the liquid flame retardant.

Another object of the present invention is to provide a light laminated acoustic absorption sheet which has an excellent strength and a mechanical or physical property.

DETAILED DESCRIPTION OF THE INVENTION

The present invention is directed to a light laminated acoustic absorption sheet with flame retardant, wherein one or more thermoplastic fibers (a) having a low melting point and selected from polyethylene, polypropylene, polyvinyl chloride, polyester, polyethylene-polyester copolymers, and one or more polyester interlaced-textured yarns or thermoplastic hollow fibers (b) selected from polyester, polyethylene, nylon, hot-meltable fluororesin are mixed and opened so as to prepare a mat, and two or more sheets of mats are laminated by using an apparatus of manufacturing a stampable sheet so as to manufacture the laminated sheet, and then the laminated sheet is impregnated with flame retardant liquid.

According to the present invention, in case that 10~20 denier fibers of 20~95 weight % and 2~7 denier fibers of 5~80 weight % mixed, it is possible to obtain a light weight and an improved strength.

Further, according to the present invention, since special structural fibers such as hollow fibers and interlaced-textured yarns which can contain air therein are used so as to form a three-dimensional network having a multi-layered bulky structure, it is possible to manufacture the light laminated sheet having a fine porous layer. Furthermore, since two kinds of fibers having a different denier within a certain extent are used, pores are formed between the fibers, thereby realizing a light weight, an excellent strength and excellent acoustic absorption ability and adiabaticity of the laminated sheet.

Preferably, the mat is manufactured by using thermoplastic resin fibers of 30~95 weight %, which has a low melting point, and polyester interlaced-textured yarns or thermoplastic resin hollow fibers of 5~70 weight %, which has a high melting point.

Further, the laminated acoustic absorption sheet has preferably one or more laminated sheets of mats, more preferably, 2~4 laminated sheets of mats so as to increase the acoustic absorption ability and adiabaticity. And if necessary, another sheet made of wood, metal, paper and the like can be added to one or both sides of the acoustic absorption sheet, and also UV coating can be applied or a pattern can be printed.

According to the present invention, if the thermoplastic fibers (a) having a low melting point is an ordinary one that is used in the art, it is not limited specially. However, the thermoplastic fibers (a) is selected preferably from polyethylene, polypropylene, polyvinyl chloride, polyester, polyethylene-polyester copolymers, and more preferably has a melting point of 80~120° C.

According to the present invention, preferably, a content of the thermoplastic fibers having a low melting point is 30~95 weight %. In case that the content is less than 30 weight %, it is not possible to obtain the sufficient light weight, acoustic absorption ability and adiabaticity. Also, in case that the content is more than 95 weight %, it is not possible to obtain the sufficient light weight.

According to the present invention, the thermoplastic hollow fibers (b) are respectively formed to have a hollowed space therein. Preferably, the thermoplastic hollow fibers have thermal endurance of 200° C. or more, more preferably, 200~280° C. The thermal endurance is a glass transition temperature or a melting temperature (melting point). When using such the hollow fibers, since the hollowed space formed in the hollow fibers has a higher thermal endurance than the thermoplastic fibers having a low melting point even while passing through the apparatus of manufacturing the stampable sheet, the hollowed space is be maintained and thus it is possible to increase the acoustic absorption ability and adiabaticity. For example, the hollow fibers can be selected from polyester, polyethylene, nylon, hot-meltable fluororesin. The hollowed space may have any shapes such as a circular shape, a triangular shape and the like. The hot-meltable fluororesin may comprise tetrafluoroethylene-hexafluoropropylene copolymer (FEP), tetrafluoroethylene-perfluoroalkyl vinyl ether copolymer (PFA), tetrafluoroethylene-hexafluoropropylene-perfluoroalkyl vinyl ether copolymer (EPA), tetrafluoroethylene-ethylene copolymer (ETFE) and the like. By using such the hollow fibers, it is possible to obtain the excellent acoustic absorption ability and adiabaticity due to the hollowed space.

Furthermore, the polyester interlaced-textured yarns (b) means mixed yarns in which the polyester hollow fibers and high shrinkable polyester fibers having a boiling water shrinkage of 10~50% are supplied at the same time and then knotted by air from an interlace nozzle so that the two fibers are combined. And it is not matter that the polyester hollow fiber as a raw fiber is partially or completely oriented, but it is preferable that the polyester hollow fiber is partially oriented so as to largely reveal a difference in the shrinkage with respect to the high shrinkable polyester fibers and thus emboss the bulky structure. As an example of the polyester interlaced-textured yarn of the present invention, there is disclosed a manufacturing method thereof in Korean Laid-Open Publication No. 10-2004-0049035. According to the present invention, it is possible to manufacture the lighter sheet having the bulky structure by using the polyester interlaced-textured yarn. Further, the interlaced-textured yarn has preferably thermal endurance of 200° C. or more, more preferably, 200~280° C.

The thermoplastic hollow fibers and the polyester interlaced-textured yarn may be used selectively or mixed together. It is preferable that the content is 5~70 weight %. If the content is less than 5 weight %, it is not possible to obtain the sufficient light weight, acoustic absorption ability and adiabaticity. And if the content is more than 70 weight %, a manufacturing cost is increased.

In addition, according to the present invention, it is possible to control the physical properties of the laminated sheet by selectively using a denier of the fiber. Particularly, it is preferable that the sheet is fabricated by mixing 10~20 denier fibers of 20~95 weight % and 2~7 denier fibers of 5~80 weight %, it is more preferably that 10~20 denier polyester interlaced-textured yarns or thermoplastic hollow fibers (b) having a high melting point and 2~7 denier thermoplastic fibers (a) having a low melting point are mixed.

The 10~20 denier fiber functions as an iron reinforcing bar in the concrete casting, and the 2~7 denier fiber functions to form the hollowed space, and thus it is possible toy obtain the excellent acoustic absorption ability and adiabaticity.

According to the present invention, the reason why the fibers are limited to the 10~20 denier and the 2~7 denier is caused by that it is possible to obtain the excellent acoustic absorption ability and adiabaticity as well as the sufficient strength. The reason why the extent of content is limited is the same.

In other words, according to the present invention, it is possible to freely manufacture the laminated sheet by adjusting the deniers and kinds of the fibers.

Also, the flame retardant liquid is not limited especially in the present invention, and thus the flame retardant liquid may comprise phosphoric flame retardant, halogen flame retardant and the like. Also, the flame retardant liquid may be prepared by mixing sodium silicate of 10~50 parts by weight with respect to a mixed solution of 100 parts by weight in which methyl cellulose of 20~40 weight %, boric acid of 10~15 weight %, borax of 5~10 weight %, sodium hydroxide of 0.01~1 weight %, triphenyl phosphate of 1~10 weight %, and water of 40~60 weight % are mixed.

According to the present invention, there is provided a method of manufacturing a light laminated acoustic absorption sheet with flame retardant, comprising the steps a) mixing thermoplastic resin fiber (a) having a low melting point and polyester interlaced-textured yarn or thermoplastic resin hollow fiber (b) having a high melting point and then opening; b) passing the mixed/opened fibers through a carding machine so as to prepare a mat; c) laminating two or more sheets of the mats; d) fastening the laminated mats by needle punching; e) supplying the laminated sheet to an apparatus of manufacturing a stampable sheet, which is provided with a plate type conveyer belt having a plurality of through-holes, and preheating the laminated sheet so that hot wind is transferred through the through-holes to an inside of the mat, and then heat-binding, pressing, cooling and cutting the laminated mat melted by the hot wind; and f) immersing the laminated mat in flame retardant liquid which is stored in a reaction bath and then drying.

In other words, since the laminated mat is passed through the preheating zone of the apparatus of manufacturing the stampable sheet and then divided and melted, the thermoplastic resin fiber can be infiltrated into the tangled reinforcing fibers, and the melted laminated mat is pressed by pressing rollers provided in a pressing zone so as to have a desired thickness. At this time, since the processes of the apparatus of manufacturing the stampable sheet can be changed, the preheating, heat-binding, pressing, cooling and cutting processes also can be changed according to the apparatus. Further, since the parameters such as temperature, pressure and the like also can be changed, they are not limited especially in the present invention.

Some examples of the apparatus of manufacturing the stampable sheet are disclosed in Korean patent No. 10-2006-0099597 and 10-2006-0103752.

According to the present invention, even in case that the multiple mats are laminated by the plate type conveyer belt having a plurality of through-holes, the hot wind can be transferred through the through-holes to the inside of the mat, and thus the laminated mats can be adhered with excellent adhesive force and also have an improved strength.

Hereinafter, the embodiment of the present invention will be described. However, the present invention will not be limited to the embodiment.

In the embodiment, the acoustic absorption sheet, which is prepared by materials having following physical properties, is used.

polyester interlaced-textured yarn, which is fabricated by interlacing polyester partially-oriented hollow filament and highly shrinkable polyester filament having a boiling water shrinkage of 30% at a speed of 400 m/minute and a pressure of 3 bar, is used.

flame retardant liquid, which is prepared by mixing sodium silicate of 50 parts by weight with respect to a mixed solution of 100 parts by weight in which methyl cellulose of 30 weight %, boric acid of 12 weight %, borax of 8 weight %, sodium hydroxide of 0.5 weight %, triphenyl phosphate of 8.5 weight %, and water of 41 weight % are mixed.

EMBODIMENT

Manufacturing of 3-Layer Laminated Sheet with a Single Kind of Mat 5 denier polyester fiber (melting temperature of 110° C.) of 45 weight % and 15 denier polyester interlaced-textured yarn (melting temperature of 245° C.) of 55 weight % are mixed and opened, and then passed through a cylindrical carding machine so as to prepare a mat.

Three sheets of mats are laminated and fastened by needle punching and then pressed to have a thickness of 20 mm. The laminated mats are supplied to an apparatus of manufacturing a stampable sheet and passed through rollers, which are respectively preheated at 170° C., 200° C. and 230° C., at a speed of 8M/min so as to prepare a sheet having a thickness of 7 mm. Then, the sheet is passed through a water cool zone of 50° C. at a speed of 8M/min and again passed through a water cool zone of 30° C. at a speed of 8 M/min so as to manufacture a final laminated sheet having a thickness of 5 mm.

The manufactured laminated sheet is sufficiently immersed in the flame retardant liquid and then dried at 130° C. for 30 minutes. Table 1 shows physical properties of the manufacture acoustic absorption sheet.

TABLE 1

| Test method | | unit | Measuring method | Embodiments |
|---|---|---|---|---|
| Thickness | | mm | | 9 |
| Weight | | g/m² | | 2000 |
| Moisture contents | | % | ASTM D1037 | 3.54 |
| Tensile strength | MD | MPa | ASTM D638 | 23.7 |
| | AMD | MPa | | 15.7 |
| Tensile modulus | MD | GPa | ASTM D638 | 3.87 |
| | AMD | GPa | | 1.98 |
| Tensile elongation | MD | % | ASTM D638 | 2.35 |
| | AMD | % | | 3.27 |
| Flexural strength | MD | MPa | ASTM D790 | 23.5 |
| | AMD | MPa | | 16.9 |
| Flexural modulus | MD | GPa | ASTM D790 | 2.87 |
| | AMD | GPa | | 1.67 |
| Acoustic absorption ability (Tube method) | | % | KSF2805 | 3.5 |
| Adiabaticity | | W/m²K | KSF2271-1998 | 0.8 |
| Flame retardancy | Afterflaming time | sec | Meckel burner method in enforcement decree of Korean fire survices act | 0 |
| | Afterglow time | sec | | 0 |
| | Char area | cm² | | 0 |
| | Char length | mm | | 0 |

The acoustic absorption ability is measured by the tube method and indicated by an average value measured at 250 Hz, 500 Hz, 1000 Hz and 2000 Hz.

As shown in Table 1, the laminated acoustic absorption sheet of the present invention can be manufacture so as to have a light weight. Further, since the laminated acoustic absorption sheet has excellent flame retardancy as well as excellent mechanical or physical property, it can be used as a building interior sheet.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

According to the present invention as described above, since thermoplastic resin fiber having a low melting point and thermoplastic resin hollow fiber having a high melting point or polyester interlaced-textured yarn is mixed at a desired rate, the laminated acoustic absorption sheet has a light weight as well as excellent mechanical or physical property. Further, since the eco-friendly flame retardant liquid is impregnated therein, it can be used as a building interior sheet having excellent flame retardancy.

The invention claimed is:

1. A light laminated acoustic absorption sheet with flame retardant, wherein one or more thermoplastic fibers (a) having a low melting point and selected from polyethylene, polypropylene, polyvinyl chloride, polyester, polyethylene-polyester copolymers, and one or more polyester interlaced-textured yarns or thermoplastic hollow fibers (b) having a higher melting point than the thermoplastic fiber (a) and selected from polyester, polyethylene, nylon, hot-meltable fluororesin are mixed and opened so as to prepare a mat, and two or more sheets of mats are laminated by using an apparatus of manufacturing a stampable sheet so as to manufacture the laminated sheet, and then the laminated sheet is impregnated with flame retardant liquid.

2. The light laminated acoustic absorption sheet with flame retardant according to claim 1, wherein the mat is manufactured by using thermoplastic resin fibers of 30~95 weight %, which has a low melting point of 80~120° C., and polyester interlaced-textured yarns or thermoplastic resin hollow fibers of 5~70 weight %, which has a high melting point of 200~280° C.

3. The light laminated acoustic absorption sheet with flame retardant according to claim 2, wherein the polyester interlaced-textured yarn is prepared by interlacing polyester hollow fibers and high shrinkable polyester fibers.

4. The light laminated acoustic absorption sheet with flame retardant according to claim 3, wherein the mat is mixed with 10~20 denier fibers of 20~95 weight % and 2~7 denier fibers of 5~80 weight %.

5. The light laminated acoustic absorption sheet with flame retardant according to claim 1, wherein the flame liquid is prepared by mixing sodium silicate of 10~50 parts by weight with respect to a mixed solution of 100 parts by weight in which methyl cellulose of 20~40 weight %, boric acid of 10~15 weight %, borax of 5~10 weight %, sodium hydroxide of 0.01~1 weight %, triphenyl phosphate of 1~10 weight %, and water of 40~60 weight % are mixed.

6. A method of manufacturing a light laminated acoustic absorption sheet with flame retardant, comprising the steps:
   a) mixing thermoplastic resin fiber (a) having a low melting point of 80~120° C. and polyester interlaced-textured yarn or thermoplastic resin hollow fiber (b) having a high melting point of 200~280° C. and then opening;
   b) passing the mixed/opened fibers through a carding machine so as to prepare a mat;
   c) laminating two or more sheets of the mats;
   d) fastening the laminated mats by needle punching;
   e) supplying the laminated sheet to an apparatus of manufacturing a stampable sheet, which is provided with a plate type conveyer belt having a plurality of through-holes, and preheating the laminated sheet so that hot wind is transferred through the through-holes to an inside of the mat, and then heat-binding, pressing, cooling and cutting the laminated mat melted by the hot wind; and
   f) immersing the laminated mat in flame retardant liquid which is stored in a reaction bath and then drying.

* * * * *